United States Patent Office 3,446,827
Patented May 27, 1969

---

3,446,827
ORGANOTIN OR MERCURY (CARBOXY HYDROCARBYLENE AMIDES)
Herbert Schwartz, Chimes Terrace, Vineland, N.J. 08360, and Joseph B. Skaptason, 12700 Prospect Ave., Rte. 30, Kansas City, Mo. 64146
No Drawing. Filed Apr. 5, 1966, Ser. No. 540,200
Int. Cl. C07f 3/12, 7/22
U.S. Cl. 260—429.7         15 Claims

ABSTRACT OF THE DISCLOSURE

Organometallic salts of the formula

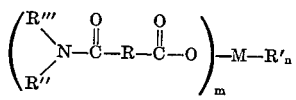

wherein R is an organic radical, R' and R" are selected from the group consisting of aliphatic radicals of 1 to 18 carbon atoms, cycloaliphatic radicals of 3 to 8 carbon atoms, aryl radicals and araliphatic radicals, R''' is selected from the group consisting of hydrogen, aliphatic radicals of 1 to 18 carbon atoms, cycloaliphatic radicals of 3 to 8 carbon atoms, aryl radicals and araliphatic radicals and R" and R''' taken together with the nitrogen atom may form a heterocyclic radical, M is a metal in its highest state of oxidation and $n$ and $m$ are integers from 1 to 3, and $m+n$ is not greater than 4.

The organometallic salts of Formula I have a wide range of biocidal activity and are useful as bactericides, fungicides, nematocides, acaricides, insecticides and as pre- and post-emergence herbicides.

OBJECTS OF THE INVENTION

It is an object of the invention to provide novel organometallic salts of Formula I.

It is another object of the invention to provide novel biocidally active compositions.

These and other objects and advantages of the invention will become obvious from the following detailed description.

THE INVENTION

The novel organometallic salts of the invention have the formula

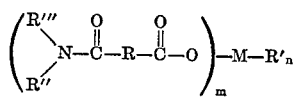

wherein R is an organic radical, R' and R" are selected from the group consisting of aliphatic radicals of 1 to 18 carbon atoms, cycloaliphatic radicals of 3 to 8 carbon atoms, aryl radicals and araliphatic radicals, R''' is selected from the group consisting of hydrogen, aliphatic radicals of 1 to 18 carbon atoms, cycloaliphatic radicals of 3 to 8 carbon atoms, aryl radicals and araliphatic radicals and R" and R''' taken together with the nitrogen atom may form a heterocyclic radical, M is a metal in its highest state of oxidation and $n$ and $m$ are integers from 1 to 3, and $m+n$ is not greater than 4.

The salts of Formula I are derived from monoamides of dicarboxylic acids which may be aliphatic, aromatic, cycloaliphatic or heterocyclic. Examples of suitable dicarboxylic acids whose monoamides are used to form the organometallic salts of the invention are aliphatic dicarboxylic acids such as maleic acid, fumaric acid, succinic acid, glutaric acid, adipic acid, sebacic acid, citraconic acid, itaconic acid, etc.; aromatic acids such as phthalic acid, terephthalic acid, isophthalic acid, hydroxyphthalic acid, xylidic acid, uvitic acid, cumidic acid, 1,5-naphthalene dicarboxylic acid, 1,8-naphthalene dicarboxylic acid, etc.; cyclo aliphatic dicarboxylic acids such as dihydrophthalic acid, tetrahydrophthalic acid, hexahydrophthalic acid, tetrahydroterephthalic acid, tetrahydroisophthalic acid, hexahydroisophthalic acid, etc.; and heterocyclic dicarboxylic acids such as quinolinic acid, lutidinic acid, isocinchomeronic acid, dipiolinic acid, dinicotinic acid, etc.

The amide portion of the amic acids is derived from aliphatic, cycloaliphatic, aromatic, araliphatic and heterocyclic amines. Examples of suitable amines are aliphatic amines such as methyl amine, dimethylamine, butyl amine, hexyl amine, oleylamine, dipropylamine, etc.; aromatic amines such as aniline, p-bromo aniline, 3-methoxy aniline, naphthylamine, 3,4-dichloroaniline, 4-methylaniline, etc.; araliphatic amines such as benzylamine, phenethylamine, etc.; cycloaliphatic amines such as cyclohexylamine, etc.; and heterocyclic amines such as morpholine, piperidine, piperazine, pyrrolidine, etc.

The organometallic salts of Formula I can be prepared by reacting the appropriate amic acid with the desired organometallic oxide and hydroxide in an inert organic solvent or by reacting a salt of the desired amic acid with an appropriate organometallic salt.

Examples of suitable metals which are employed in their highest state of oxidation or highest valence state are mercury, tin, lead, germanium, silicon, etc.

Preferred organometallic compounds of Formula I are compounds wherein R' and R" are selected from the group consisting of alkyl of 1 to 10 carbon atoms, halogenated alkyl of 1 to 10 carbon atoms, alkenyl and alkynyl radicals of 1 to 10 carbon atoms, cycloalkyl radicals of 4 to 8 carbon atoms, naphthyl, phenyl and phenyl substituted with at least one substituent selected from the group consisting of halogen, lower alkyl and halogenated lower alkyl of 1 to 7 carbon atoms, hydroxy, lower alkoxy of 1 to 7 carbon atoms and nitro and R''' may be selected from the same group as R' or hydrogen.

The said compounds can be formulated into various forms such as concentrates, emulsions, solutions, pastes, wettable powders, etc. depending upon the desired use. In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachloroethane, trichloroethylene or tri- or tetrachlorobenzenes.

Aqueous preparations suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or of a mixture of these acids, or the sodium salt of petroleum-sulfonic acid. As cation-active dispersing agents there may be used, quaternary ammonium compounds, such as cetyl-pyridinium bromide or di(hydroxyethyl)-benzyl-dodecyl-ammonium chloride.

For making dusting or scattering preparations there may be used as solid carriers talcum kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances there may be mentioned fatty acids, resins, glue, casein or, for example, alginates or the like.

In the following examples there are described several preferred embodiments to illustrate the invention. However, it should be understood that the invention is not intended to be limited to the specific embodiments.

Example I.—Preparation of triphenyltin 3',4'-dichlorosuccinanilate 0.1 mol of triphenyltin hydroxide and 0.1 mol of 3',4'-dichlorosuccinanilic acid were added to 500 ml. of benzene in a round bottom flask fitted with a water separator. The mixture was refluxed with the water of reaction being distilled off as an azeotropic mixture and the separated benzene being returned to the flask from the separator. After 0.1 mol of water had been collected in the water separator, the benzene was distilled off leaving as a residue crystalline triphenyltin 3',4'-dichlorosuccinanilate having a melting point of 148 to 149° C. A determination found 19.45% tin (theoretical—19.43%).

Example II

Using the procedure of Example I, triethyltin hydroxide was reacted with N-hexylmaleamic acid to form triethyltin N-hexylmaleamate having a melting point of 79 to 81.5° C. and containing 29.86% tin and 3.42% nitrogen (theoretical—29.38% tin and 3.47% N).

Example III

Using the procedure of Example I, tributyltin hydroxide was reacted with N-hexylmaleamic acid to form tributyltin N-hexylmaleamate as an oil containing 23.95% tin (theoretical—24.34%).

Example IV

Using the procedure of Example I, triphenyltin hydroxide was reacted with N-hexylmaleamic acid to form triphenyltin N-hexylmaleamate having a melting point of 126 to 127.5° C. and containing 21.77% tin (theoretical—21.66%).

Example V

Using the procedure of Example I, triethyltin hydroxide and 3',4'-dichloromaleanilic acid were reacted to form triethyltin 3',4'-dichloromaleanilate having a melting point of 139 to 141° C. and containing 25.98% tin and 3.09% N (theoretical—25.53% tin and 3.01% N).

Example VI

Using the procedure of Example I, tributyltin hydroxide was reacted with 3',4'-dichloromaleanilic acid to form tributyltin 3',4'-dichloromaleanilate having a melting point of 89.5 to 90° C. and containing 21.76% tin (theoretical—21.62%).

Example VII

Using the procedure of Example I, triphenyltin hydroxide was reacted with 3',4'-dichloromaleanilic acid to form triphenyltin 3',4'-dichloromaleanilate having a melting point of 155 to 156.5° C. and containing 19.61% tin (theoretical—19.49%).

Example VIII

Using the procedure of Example I, tributyltin hydroxide was reacted with 3',4'-dichlorosuccinanilic acid to form tributyltin 3',4'-dichlorosuccinanilate having a melting point of 158–159° C.

Example IX

Using the procedure of Example I, tributyltin hydroxide was reacted with 3'-chlorosuccinanilic acid to form tributyltin 3'-chlorosuccinnanilate having a melting point of 60 to 64° C.

Example X

Using the procedure of Example I, tributyltin hydroxide was reacted with 3'-trifluoromethylsuccinanilic acid to form tributyltin 3'-trifluoromethylsuccinanilate having a melting point of 69 to 72° C.

Example XI

Using the procedure of Example I, tributyltin hydroxide was reacted with 4'-chloro-3'-trifluoromethylsuccinanilic acid to form tributyltin 4'-chloro-3'-trifluoromethylsuccinanilate having a melting point of 63 to 66° C.

Example XII

Using the procedure of Example I, tributyltin hydroxide was reacted with N,N-diethylsuccinamic acid to form tributyltin N,N-diethylsuccinamate having a melting point of 70 to 72° C.

Example XIII

Using the procedure of Example I, tributyltin hydroxide was reacted with N,N-di-n-propylsuccinamic acid to form tributyltin N,N-di-n-propylsuccinamate having a melting point of 56 to 59° C.

Example XIV 0.1 mol of sodium N-hexylmaleamate and 0.1 mol of phenylmercuric chloride were added to a flask containing 500 cc. of benzene and the mixture was refluxed with stirring for 3 days after which the benzene was removed by distillation. The residue was washed with water and dried to obtain a white powder of phenylmercuric N-hexylmaleamate which did not melt below 300° C. and contained 2.90% N (theoretical—2.94%).

BIOCIDAL ACTIVITY

A. Nematocidal activity

The tests were carried out in stoppered test tubes containing 10 cc. of the solution to be tested and the nematode population at the time of seeding was adjusted to 50 to 75 per tube. The tests were run in duplicate and the blanks contained the nema in tap water. The organism used was a species of Panagrellus, an active saprozoic nematode. Daily microscopic observations of the nema were made to determine the percent of mortality which was easily determined because of the constant and active movement of live nema of this species. The test results are summarized in Table I.

TABLE I

| Compound | Dosage, p.p.m. | Percent mortality after days | | | | | | |
|---|---|---|---|---|---|---|---|---|
| | | 1 | 2 | 3 | 4 | 5 | 6 | 7 |
| Phenylmercuric N-hexylmaleamate | 50 | 100 | 100 | 100 | 100 | | 100 | |
| | 5 | 0 | 0 | 0 | | | 20 | |
| Triethyltin N-hexylmaleamate | 50 | | 100 | | 100 | | | 100 |
| | 5 | | 70 | | 85 | | | 100 |
| Tributyltin N-hexylmaleamate | 50 | 100 | 100 | | | | 100 | |
| | 5 | 100 | 100 | | | | 100 | |
| Triphenyltin N-hexylmaleamate | 50 | | 100 | | 100 | | | 100 |
| | 5 | | 50 | | 87 | | | 100 |
| Triethyltin 3',4'-dichloromaleanilate | 50 | | 100 | | 100 | | | 100 |
| | 5 | | 20 | | 37 | | | 25 |
| Tributyltin 3',4'-dichloromaleanilate | 50 | | 100 | | 100 | | | 100 |
| | 5 | | 100 | | 100 | | | 100 |
| Triphenyltin 3',4'-dichloromaleanilate | 50 | | 100 | | 100 | | | 100 |
| | 5 | | 99 | | 100 | | | 100 |
| Triphenyltin 3',4'-dichlorosuccinanilate | 50 | | 100 | | 100 | | | 100 |
| | 5 | | 100 | | 100 | | | 100 |
| Tributyltin 3',4'-dichlorosuccinanilate | 50 | 100 | | | 100 | | | |
| | 5 | 99 | | | 100 | | | |
| Tributyltin 3'-chlorosuccinanilate | 50 | 100 | | | 100 | | | |
| | 5 | 90 | | | 100 | | | |
| Tributyltin-3'-CF$_3$-succinanilate | 50 | 100 | | | 100 | | | |
| | 5 | 95 | | | 100 | | | |
| Tributyltin-4'-chloro-3'-CF$_3$-succinanilate | 50 | 100 | | | 100 | | | |
| | 5 | 100 | | | 100 | | | |
| Tributyltin-N,N-diethyl succinamate | 50 | 100 | | | 100 | | | |
| | 5 | 100 | | | 100 | | | |
| Tributyltin N,N-dipropyl succinamate | 50 | 100 | | | 100 | | | |
| | 5 | 100 | | | 100 | | | |
| Nemagon | 50 | 5 | | 70 | | 95 | | |
| | 5 | | | | | 25 | | |
| Control | | 0 | 0 | 0 | 0 | 0 | 0 | 0 |

Table I shows that the organometallic compounds have a greater nematocidal activity than the commercial nematocide, Nemagon, which is 1,2-dibromo-3-chloropropane.

B. Seed disinfectant activity

Oat seeds heavily infected with *Helminthosporium avenae* was immersed for 15 minutes in solutions containing various concentrations of the test compounds after which the solutions were drained off and the seeds were then plated out on Petri dishes containing moistened filter paper. The results are summarized in Table II.

TABLE II

| Compound | Dosage, p.p.m. | Percent Disease Control | Germination Oat Seeds |
|---|---|---|---|
| Phenylmercuric N hexylmaleamate | 5,000 | 100 | 0 |
| | 500 | 100 | 0 |
| | 50 | 90 | 80 |
| Triethyltin N hexylmaleamate | 5,000 | 100 | 0 |
| | 500 | 100 | 0 |
| | 50 | 80 | *80(t) |
| Tributyltin N hexylmaleamate | 5,000 | 100 | 8 |
| | 500 | 100 | 58 |
| | 50 | 86 | 64 |
| Triphenyltin N hexylmaleamate | 5,000 | 82 | 46 |
| | 500 | 34 | 76 |
| | 50 | 4 | 86 |
| Triethyltin 3',4' dichloro maleanilate | 5,000 | 100 | 0 |
| | 500 | 100 | 0 |
| | 50 | 86 | *42(t) |
| Tributyltin 3',4' dichloro maleanilate | 5,000 | 100 | 14 |
| | 500 | 82 | 72 |
| | 50 | 26 | 76 |
| Triphenyltin 3',4' dichloro maleanilate | 5,000 | 99 | 32 |
| | 500 | 44 | 76 |
| | 50 | 20 | 84 |
| Triphenyltin 3',4' dichloro succinanilate | 5,000 | 90 | 22 |
| | 500 | 50 | 80 |
| | 50 | 8 | 88 |
| Panogen-15 (Standard) | 5,000 | 100 | 0 |
| | 500 | 90 | 30 |
| | 50 | 34 | 46 |
| Check | | | 44 |

*t=Slight toxicity to seeds.

Table II shows that the compounds of Formula I are superior to the commercial seed disinfectant, Panogen-15 which is methylmercuric dicyandiamide. In addition, the compounds of the invention stimulated seed germination at low dosages which can be seen by comparing the percent of germination with that of the check.

Since both phenylmercuric N-hexylmaleamate and Panogen-15 are organomercurials, they were compared in the same test at lower dosages. The results are shown in Table III.

TABLE III

| Chemical | Dosage, p.p.m. | Percent Disease Control | Germination |
|---|---|---|---|
| Phenylmercuric N hexylmaleamate | 500 | 100 | 0 |
| | 250 | 100 | 22 |
| | 125 | 100 | 28 |
| | 62 | 100 | 36 |
| | 31.5 | 98 | 80 |
| Panogen-15 | 500 | 100 | 72 |
| | 250 | 96 | 79 |
| | 125 | 96 | 69 |
| | 62 | 70 | 80 |
| | 31.5 | 12 | 80 |
| Check | | | 74 |

Table III shows that phenylmercuric N-hexylmaleamate is a far superior seed disinfectant than Panogen-15. Since the said test was conducted on a weight basis rather than on a molar basis, it is important to consider that phenylmercuric N-hexylmaleamaate has a molecular weight 1.6 times that of Panogen-15 and on a molar basis the results are even more striking.

C. Insecticidal activity (1) *Confused flour beetle.*—The insecticidal activity was determined on the confused flour beetle (*Tribolium confusum*) by placing the beetles in 9.6 cm. Petri dishes to which had been added one milliliter of acetone containing 1000 p.p.m. of the test compound and the acetone allowed to evaporate. The percent mortality of the beetles was determined on the first and the fifth day and the results are summarized in Table IV.

TABLE IV

| Compound | Percent mortality | |
|---|---|---|
| | 1 day | 5 days |
| Triethyltin N hexylmaleamate | 100 | 100 |
| Triphenyltin N hexylmaleamate | 100 | 100 |
| Triethyltin 3',4' dichloromaleanilate | 100 | 100 |
| Tributyltin 3',4' dichloromaleanilate | 70 | 90 |
| Triphenyltin 3',4' dichloromaleanilate | 80 | 90 |
| Triphenyltin 3',4' dichlorosuccinanilate | 80 | 100 |

Table IV sohws that the tin compounds of the invention are extremely effective against the confused flour beetle particularly since Chlordane, a commercial insecticide, at 5000 p.p.m. show only 35% and 85% mortality after 2 and 6 days, respectively.

(2) *Drosophilia melanogaster.*—The test compounds were applied as thin film of acetone containing 1000 p.p.m. and 500 p.p.m. of the compounds to the walls of a test tube (25 mm. x 200 mm.) and 10 flies (*Drosophilia melanogaster*) were released into the test tube which was then stoppered with absorbent cotton. The flies had sufficient food for three days. The percent mortality was determined after 24 and 48 hours and in some instances the knock-down time was determined. The results are summarized in Table V.

TABLE V

| Compound | Dosage, p.p.m. | Percent Mortality 24 hrs. | Percent Mortality 48 hrs. | Knock-down time |
|---|---|---|---|---|
| Triethyltin N-hexylmaleamate | 1,000 | 100 | 100 | |
|  | 500 | 100 |  | 10 min. |
| Tributyltin N-hexylmaleamate | 1,000 | 100 | 100 | |
|  | 500 | 100 |  | |
| Triethyltin 3',4'-dichloromaleanilate | 1,000 | 100 | 100 | |
|  | 500 | 100 |  | 10 min. |
| Tributyltin 3',4'-dichloromaleanilate | 1,000 | 100 | 100 | 1 hour. |
|  | 500 | 100 |  | 24 hours. |
| Phenylmercuric N-hexylmaleamate | 1,000 | 88 | 100 | |
| Tributyltin 3',4'-dichlorosuccinanilate | 100 | 90 | 100 | |
| Tributyltin 3'-chlorosuccinanilate | 100 | 75 | 100 | |
| Tributyltin 3'-CF$_3$-succinanilate | 100 | 83 | 100 | |
| Tributyltin 4'-chloro-3'-CF$_3$-succinanilate | 100 | 71 | 100 | |
| Tributyltin N,N-diethylsuccinamate | 100 | 76 | 100 | |
| Tributyltin N,N-dipropylsuccinamate | 100 | 82 | 100 | |

Tables IV and V show that the compounds of Formula I are extremely effective insecticides.

(3) Mexican bean beetle.—The insecticidal activity was determined on the Mexican bean beetle by the leaf dip method at doses of 1,000, 500 and 250 p.p.m. of the test compounds, and the percent mortality of the beetles was determined on the fifth day. The results are summarized in Table V(A) and they show the extreme effectiveness of these compounds.

TABLE V(A)

| Compound | Dose, p.p.m. | Percent Kill |
|---|---|---|
| Tributyltin 3',4'-dichlorosuccinanilate | 1,000 | 100 |
|  | 500 | 100 |
|  | 250 | 100 |
| Tributyltin 3'-chlorosuccinanilate | 1,000 | 100 |
|  | 500 | 100 |
|  | 250 | 50 |
| Tributyltin 3'-CF$_3$-succinanilate | 1,000 | 100 |
|  | 500 | 100 |
|  | 250 | 62 |
| Tributyltin 4'-chloro-3'-CF$_3$-succinanilate | 1,000 | 100 |
|  | 500 | 100 |
|  | 250 | 62 |
| Tributyltin N,N-diethylsuccinamate | 1,000 | 100 |
|  | 500 | 100 |
|  | 250 | 89 |
| Tributyltin N,N-dipropyl succinamate | 1,000 | 100 |
|  | 500 | 100 |
|  | 250 | 75 |
| Untreated Control | | 0 |

D. Acaricidal activity

Leaves infested with two-spotted spider mites, *Tetranychus bimaculatus*, were dipped momentarily into distilled water solutions or suspensions containing 1000 p.p.m. of the test compound and then placed into a rack to drip dry. The test racks were held at a temperature of 78 to 80° F. and percent mortality was determined after 24 and 48 hours.

The results are summarized in Table VI.

TABLE VI

| Compound | Percent mortality 24 hrs. | Percent mortality 48 hrs. |
|---|---|---|
| Phenylmercuric N-hexylmaleamate | 43 | 72 |
| Triethyltin N-hexylmaleamate | 92 | 99 |
| Tributyltin N-hexylmaleamate | 50 | 100 |
| Triphenyltin N-hexylmaleamate | 35 | 24 |
| Triethyltin 3',4'-dichloromaleanilate | 90 | 100 |
| Tributyltin 3',4'-dichloromaleanilate | 100 | 100 |
| Triphenyltin 3',4'-dichloromaleanilate | 87 | 19 |
| Triphenyltin 3',4'-dichlorosuccinanilate | 14 | 11 |
| Tributyltin 3',4'-dichlorosuccinanilate | 100 | 100 |
| Tributyltin 3'-chlorosuccinanilate | 100 | 100 |
| Tributyltin 3'-CF$_3$-succinanilate | 100 | 100 |
| Tributyltin 4'-chloro-3'-C$_3$F-succinanilate | 100 | 100 |
| Tributyltin N,N-diethylsuccinamate | 100 | 100 |
| Tributyltin N,N-dipropylsuccinamate | 100 | 100 |
| Kelthane | 100 | 100 |

Table VI shows that the compounds of Formula I possess acaricidal activity, particularly the compounds where R' is alkyl.

E. Soil-inoculum broth culture

This test determines the fungicidal and bactericidal activity of the compounds of Formula I by measuring the compounds into 10 ml. test tubes containing sufficient nutrient broth to give final concentrations of 5000, 500 and 50 p.p.m. of the compounds. 1 ml. of a stock preparation of soil providing an inoculum source for a mixture of organisms, was added to each tube and the test tubes were allowed to stand for several days. The extent of growth of fungi and bacteria which is evidenced by turbidity in the test tubes was determined periodically. The ratings were based on a scale of 0 (complete control), to 5 (no control). The results are summarized in Table VII.

TABLE VII

| Compound | Turbidity index at— 5,000 p.p.m. | 500 p.p.m. | 50 p.p.m. |
|---|---|---|---|
| Phenylmercuric N-hexylmaleamate | 0 | 0 | 0 |
| Triethyltin N-hexylmaleamate | 0 | 0 | 1 |
| Tributyltin N-hexylmaleamate | 2.5 | 4 | 4 |
| Triphenyltin N-hexylmaleamate | 0.5 | 3.5 | 4.5 |
| Triethyltin 3',4'-dichloromaleanilate | 0 | 0 | 0.5 |
| Tributyltin 3',4'-dichloromaleanilate | 0 | 2.5 | 3.5 |
| Triphenyltin 3',4'-dichloromaleanilate | 3 | 4 | 4 |
| Triphenyltin 3',4'-dichlorosuccinanilate | 3 | 4 | 5 |
| Tributyltin 3',4'-dichlorosuccinanilate | 1 | 3 | 5 |
| Tributyltin 3'-chlorosuccinanilate | 0 | 1 | 3 |
| Tributyltin 3'-CF$_3$-succinanilate | 0 | 3 | 5 |
| Tributyltin 4'-chloro-3'-CF$_3$-succinanilate | 0 | 3 | 4 |
| Tributyltin N,N-dipropyl succinamate | 1 | 5 | 5 |
| Tetrachloro-p-benzoquinone (Spergon) | 2 | 3 | 5 |

Table VII shows that the compounds of Formula I are effective in this test, particularly those wherein R' is alkyl.

F. Bactericidal activity

The test used was the agar plate-disc diffusion technique and the organisms used were *Staphyloccous aureus* (gram positive), and *Salmonella typhosa* (gram negative). Blank, sterile paper discs having a diameter of 0.7 were dipped into the solutions to be tested and were placed on the "seeded" nutrient agar. Bactericidal activity was measured as the width of the clear zone or zone of inhibition extending from the periphery of the sterile paper to the edge of the clear zone after three days. The results are summarized in Table VIII.

TABLE VIII

| Compound | Dosage, p.p.m. | Inhibition Zone in mm. S. aureus | S. typhosa |
|---|---|---|---|
| Triethyltin N-hexylmaleamate | 2,000 | 8.5 | 9.5 |
| Triphenyltin N-hexylmaleamate | 2,000 | 8.0 | 0 |
| Triethyltin 3',4'-dichloro-maleanilate | 2,000 | 8.0 | 10.5 |
| Tributyltin 3',4'-dichloro-maleanilate | 2,000 | 8.0 | 0 |
| Triphenyltin 3',4'-dichloro-maleanilate | 2,000 | 8.5 | 0 |
| Triphenyltin 3',4'-dichloro-succinanilate | 2,000 | 8.5 | 0 |
| Tributyltin 3',4'-dichloro-succinanilate | 1,000 | 0 | 0 |
| Tributyltin 3'-chloro-succinanilate | 1,000 | 4.5 | 0 |
| Tributyltin 3'-CF$_3$-succinanilate | 1,000 | 5 | 0 |
| Tributyltin 4'-chloro-3'-CF$_3$-succinanilate | 1,000 | 3 | 0 |
| Tributyltin N,N-diethyl succinamate | 1,000 | 5 | |
| Tributyltin N,N-dipropyl succinamate | 1,000 | 4 | 0 |

Table VIII shows that the compounds are effective against gram positive bacteria and that the triethyltin compounds are also effective against gram negative bacteria, which are difficult to control.

toxicity rating based on the scale of 0 (no injury), to 10 (plants killed), was made and the actual number of seeds germinating was determined. The results are summarized in Table IX.

TABLE IX

| Compound | Beet | Tomato | Radish | Johnson Grass | Oats | Wheat | Cotton |
|---|---|---|---|---|---|---|---|
| Phenylmercuric N-hexylmaleamate: | | | | | | | |
| Germ | 5 | 9 | 21 | 11 | 9 | 10 | 13 |
| PR | 10t | 8t | 7t | 7t | 5s | 2 | 1 |
| Triethyltin 3',4' dichloromaleanilate: | | | | | | | |
| Germ | 0 | 0 | 0 | 0 | 3 | 11 | 10 |
| PR | 10 | 10 | 10 | 10 | 9 | 1 | 3 |
| Tributyltin 3',4' dichloromaleanilate: | | | | | | | |
| Germ | 25 | 20 | 15 | 12 | 23 | 22 | 13 |
| PR | 8 | 7 | 5 | 2 | 0 | 0 | 0 |
| Triphenyltin 3',4' dichloromaleanilate: | | | | | | | |
| Germ | 17 | 15 | 20 | 15 | 10 | 13 | 12 |
| PR | 0 | 0 | 0 | 0 | 0 | 0 | 0 |
| Tributyltin N-hexylmaleamate: | | | | | | | |
| Germ | 7 | 11 | 11 | 15 | 11 | 10 | 15 |
| PR | 10 | 10 | 9 | 5 | 3s | 1 | 0 |
| Tributyltin 3',4'-dichlorosuccinanilate: | | | | | | | |
| %E | 0 | 0 | 20 | 26 | 92 | 88 | 65 |
| PR | 10 | 10 | 9 | 7 | 4 | 2 | 0 |
| Tributyltin 3'-chlorosuccinanilate: | | | | | | | |
| %E | 0 | 20 | 56 | 16 | 96 | 80 | 90 |
| PR | 10 | 9+ | 5 | 7 | 2 | 1 | 0 |
| Tributyltin 3'-CF$_3$-succinanilate: | | | | | | | |
| %E | 0 | 0 | 24 | 8 | 88 | 88 | 45 |
| PR | 10 | 10 | 9+ | 9+ | 5 | 2 | 5 |
| Tributyltin 4'-Cl-3'-CF$_3$-succinanilate: | | | | | | | |
| %E | 0 | 24 | 40 | 24 | 92 | 84 | 75 |
| PR | 10 | 10 | 9 | 6 | 3 | 1 | 0 |
| Tributyltin N,N-diethylsuccinamate: | | | | | | | |
| %E | 0 | 0 | 8 | 0 | 80 | 72 | 65 |
| PR | 10 | 10 | 10 | 10 | 5 | 2 | 0 |
| Tributyltin N,N-dipropyl succinamate: | | | | | | | |
| %E | 0 | 0 | 16 | 14 | 72 | 64 | 60 |
| PR | 10 | 10 | 9+ | 9 | 5 | 3 | 0 |
| Karmex: | | | | | | | |
| %E | 12 | 40 | 60 | 20 | 88 | 76 | 90 |
| PR | 10 | 10 | 10 | 9 | 7 | 6 | 3 |
| Check: | | | | | | | |
| Germ | 13 | 15 | 17 | 14 | 14 | 15 | 12 |
| PR | 0 | 0 | 0 | 0 | 0 | 0 | 0 |
| Premix Check: | | | | | | | |
| Germ | 10 | 18 | 19 | 16 | 9 | 16 | 12 |
| PR | 0 | 0 | 0 | 0 | 0 | 0 | 0 | t = toxicity; s = stunting; %E = percent of seeds germination compared to control; Germ = No. of seeds germinating.

F. Pre-emergence herbicidal activity

Soil flats were carefully filled with soil and were planted with 25 seeds of beets, tomato, radish, oats and wheat, 50 seeds of Johnson grass and 20 seeds of cotton which were then covered with a uniform amount of soil. The test compounds were prepared as 25% wettable powders using a premix consisting of 92% Hi-Sil 233 (fine hydrated silica pigment), 4% of Monasperse N (lignosulfonates), and 4% of Pluronic L-61 (polypropylene glycol-polyethylene glycol). The desired amount of the said powder was diluted with 200 ml. of water for a dosage of 10 pounds of compound per acre and the flats were uniformly drenched therewith. The flats were covered with newspaper for four days and the flats were watered for the 3 days after first emergence. After two weeks, a phytotoxicity rating based on the scale of 0 (no injury), to 10 (plants killed), was made and the actual number of seeds germinating was determined. The results are summarized in Table IX.

As can be seen from Table IX, the organomercuric and trialkyltin compounds have good pre-emergence herbicidal activity and are useful in cotton and wheat crops which are resistant thereto.

G. Post-emergence herbicidal activity

The test compounds were formulated into a concentrate containing 1 part of the compound, 1 part of Triton X–161 (organic emulsifier) and 9 parts of a mixture comprised of 90% of butylcarbitol acetate and 10% of Velsicol AR–50–G. Flats of seven seedling crops and pots of individual crops were then sprayed with an aqueous emulsion of the concentrates at a dosage of 1000 and 2000 p.p.m. of the active compound. The results are summarized in Tables X and XI.

TABLE X

| Compound | Dosage, p.p.m. | Pots | | | Phytotoxicity rating—Flats | | | | | | |
|---|---|---|---|---|---|---|---|---|---|---|---|
| | | Cotton | Crabgrass | Beans | Beets | Tomato | Radish | Flax | Rye | Oats | Wheat |
| Triethyltin N-hexylmaleamate | 2,000 | 7 | 9 | 9 | 10 | 10 | 10 | 10 | 10 | 10 | 7 |
| | 1,000 | 2 | | 8 | 10 | 10 | 10 | 10 | 5 | 4 | 4 |
| Triphenyltin N-hexylmaleamate | 2,000 | 4 | 7 | 1 | 10 | 10 | 10 | 10 | 4 | 9 | 2 |
| | 1,000 | 1 | | 1–2 | 5 | 10 | 10 | 10 | 3 | 6 | 1 |
| Triethyltin 3',4'-dichloromaleanilate | 2,000 | 7 | 9 | 4 | 10 | 10 | 10 | 10 | 9 | 9 | 5 |
| | 1,000 | 3 | | 10 | 10 | 10 | 10 | 10 | 8 | 8 | 3 |
| Tributyltin 3',4'-dichloromaleanilate | 2,000 | 4 | 1 | 2 | 10 | 10 | 10 | 10 | 8 | 10 | 1 |
| | 1,000 | 3 | | 4 | 8 | 9 | 10 | 10 | 7 | 4 | 4 |
| Triphenyltin 3',4'-dichloromaleanilate | 2,000 | 1 | 5 | 0 | 4 | 5 | 10 | 10 | 8 | 10 | 1 |
| | 1,000 | 0 | | 0 | 1 | 4 | 9 | 10 | 1 | 3 | 1 |
| Triphenyltin 3',4'-dichlorosuccinanilate | 2,000 | 2 | 3 | 2 | 8 | 10 | 10 | 10 | 9 | 9 | 8 |
| | 1,000 | 0 | | 0 | 5 | 10 | 10 | 10 | 3 | 4 | 3 |
| Phenylmercuric N-hexylmaleamate | 2,000 | | | | | | | | | | |
| | 1,000 | 0 | | 0 | 0 | 3 | 4 | 10 | 3 | 2 | 1 |
| Solvent check | | 0 | 0 | 0 | 0 | 0 | 0 | 8 | 1 | 0 | 0 |

TABLE XI

| | Dosage, Lb./Acre | Phytotoxicity Rating | | | | | | |
|---|---|---|---|---|---|---|---|---|
| | | Beets | Tomato | Radish | Oats | Wheat | Cukes | Pigweed |
| Tributyltin 3',4'-dichlorosuccinanilate | 1.9 | 10 | 10 | 10 | 2 | 2 | 10 | 10 |
| Tributyltin 3'-chlorosuccinanilate | 1.9 | 10 | 10 | 10 | 2 | 2 | 10 | 10 |
| Tributyltin 3'-CF₃-succinanilate | 1.9 | 9+ | 10 | 10 | 2 | 1 | 10 | 10 |
| Tributyltin 4'-chloro-3'-CF₃-succinanilate | 1.9 | 9 | 10 | 10 | 1 | 1 | 10 | 10 |
| Tributyltin N,N-diethyl succinamate | 1.9 | 10 | 10 | 10 | 4 | 2 | 10 | 10 |
| Tributyltin N,N-dipropyl succinamate | 1.9 | 9+ | 10 | 10 | 2 | 1 | 10 | 10 |

| | Dosage, Lb./Acre | Phytotoxicity Rating | | | | | | | |
|---|---|---|---|---|---|---|---|---|---|
| | | Setaria | Rice | Johnson Grass | | | Red Kidney | Soy Bean | Cotton |
| | | | | Small | Med. | Lge. | | | |
| Tributyltin 3',4'-dichlorosuccinanilate | 1.9 | 10 | 1 | 10 | 10 | 10 | 10 | 5 | 4 |
| Tributyltin 3'-chlorosuccinanilate | 1.9 | 10 | 1 | 10 | 9 | 10 | 8 | 9 | 7 |
| Tributyltin 3'-CF₃-succinanilate | 1.9 | 10 | 1 | 9 | 9 | 10 | 9 | 7 | 4 |
| Tributyltin 4'-chloro-3'-CF₃-succinanilate | 1.9 | 10 | 1 | 10 | 9+ | 10 | 10 | 7 | 4 |
| Tributyltin N,N-diethyl succinamate | 1.9 | 8 | 2 | 8 | 7 | 9 | 9 | 7 | 5 |
| Tributyltin N,N-dipropyl succinamate | 1.9 | 8 | 2 | 8 | 9+ | 10 | 7 | 10 | 0 |

As can be seen from Tables X and XI, the organometallic compounds of the invention possess excellent postemergence herbicidal activity.

Various modifications of the products and compositions of the invention may be made without departing from the spirit or scope thereof, and it is to be understood that the invention is to be limited only as defined in the appended claims.

We claim:
1. An organometallic compound of the formula

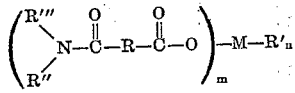

wherein R is selected from the group consisting of the cis- and trans- form of —CH=CH— and —CH$_2$—CH$_2$—, R' and R" are selected from the group consisting of alkyl of 1 to 10 carbon atoms, halogenated alkyl of 1 to 10 carbon atoms, alkenyl and alkynyl of 2 to 10 carbon atoms, cycloalkyl of 4 to 8 carbon atoms, naphthyl, phenyl and phenyl substituted with at least one substituent selected from the group consisting of halogen, lower alkyl and halogenated lower alkyl of 1 to 7 carbon atoms, hydroxy, lower alkoxy of 1 to 7 carbon atoms and nitro and R''' is selected from the group consisting of hydrogen, alkyl of 1 to 10 carbon atoms, halogenated alkyl of 1 to 10 carbon atoms, alkenyl and alkynyl of 2 to 10 carbon atoms, cyclo-alkyl of 4 to 8 carbon atoms, naphthyl, phenyl and phenyl substituted with at least one substituent selected from the group consisting of halogen, lower alkyl and halogenated lower alkyl of 1 to 7 carbon atoms, hydroxy, lower alkoxy of 1 to 7 carbon atoms and nitro, M is selected from the group consisting of mercury and tin and n and m are integers from 1 to 3 and m+n is not greater than 4.

2. A compound of claim 1 wherein R is the cis form of —CH=CH—, R' is phenyl, n is 1, M is mercury, m is 1, R" is phenyl and R''' is hydrogen.

3. A compound of claim 1 wherein R is the cis form of —CH=CH—, R' is ethyl, n is 3, M is tin, m is 1, R" is hexyl and R''' is hydrogen.

4. A compound of claim 1 wherein R is the cis form of —CH=CH—, R' is phenyl, n is 3, M is tin, m is 1, R" is hexyl and R''' is hydrogen.

5. A compound of claim 1 wherein R is the cis form of —CH=CH—, R is ethyl, n is 3, M is tin, m is 1, R" is 3,4-dichlorophenyl and R''' is hydrogen.

6. A compound of claim 1 wherein R is the cis form of —CH=CH—, R' is butyl, n is 3, M is tin, m is 1, R" is 3,4-dichlorophenyl and R''' is hydrogen.

7. A compound of claim 1 wherein R is the cis form of —CH=CH—, R' is phenyl, n is 3, M is tin, m is 1, R" is 3,4-dichlorophenyl and R''' is hydrogen.

8. A compound of claim 1 wherein R is —CH$_2$—CH$_2$—, R' is phenyl, n is 3, M is tin, m is 1, R" is 3,4-dichlorophenyl and R''' is hydrogen.

9. A compound of claim 1 wherein R is the cis form of —CH=CH—, R' is butyl, n is 3, M is tin, m is 1, R" is hexyl and R''' is hydrogen.

10. A compound of claim 1 wherein R is

—CH$_2$—CH$_2$—

R' is butyl, n is 3, M is tin, m is 1, R''' is hydrogen and R" is 3,4-dichlorophenyl.

11. A compound of claim 1 wherein R is

—CH$_2$—CH$_2$—

R is butyl, n is 3, M is tin, m is 1, R''' is hydrogen and R" is 3-chlorophenyl.

12. A compound of claim 1 wherein R is

—CH$_2$—CH$_2$—

R' is butyl, n is 3, M is tin, m is 1, R''' is hydrogen and R" is 3-trifluoromethylphenyl.

13. A compound of claim 1, wherein R is

—CH$_2$—CH$_2$—

R' is butyl, n is 3, M is tin, m is 1, R''' is hydrogen and R" is 4-chloro-3-trifluoromethylphenyl.

14. A compound of claim 1 wherein R is

—CH$_2$—CH$_2$—

R' is butyl, n is 3, M is tin, m is 1 and R" and R''' are ethyl.

15. A compound of claim 1 wherein R is

—CH$_2$—CH$_2$—

R' is butyl n is 3, M is tin, m is 1 and R" and R''' are n-propyl.

References Cited

UNITED STATES PATENTS

| 2,672,472 | 3/1954 | Yale | 260—434 |
| 2,977,379 | 3/1961 | Dorfelt et al. | 260—429.7 |
| 3,067,167 | 12/1962 | Lynn et al. | 260—429.7 X |
| 3,355,469 | 11/1967 | Herbstman | 260—429.7 |

OTHER REFERENCES

Kosolapoff, Chemical Abstracts (1962), vol. 58, p. 7962(f).

TOBIAS E. LEVOW, *Primary Examiner.*

W. F. W. BELLAMY, *Assistant Examiner.*

U.S. Cl. X.R.

260—434, 999